(12) United States Patent
Matthiessen et al.

(10) Patent No.: US 7,845,607 B2
(45) Date of Patent: Dec. 7, 2010

(54) SAFETY MECHANISM FOR MATERIALS HANDLING SYSTEM

(75) Inventors: Robert E. Matthiessen, Medford, NJ (US); Christopher L. West, Tabernacle, NJ (US)

(73) Assignee: inTEST Corporation, Cherry Hill, NJ (US)

(*) Notice: Subject to any disclaimer, the term of this patent is extended or adjusted under 35 U.S.C. 154(b) by 1092 days.

(21) Appl. No.: 10/545,537

(22) PCT Filed: Feb. 18, 2004

(86) PCT No.: PCT/US2004/004936

§ 371 (c)(1),
(2), (4) Date: Aug. 12, 2005

(87) PCT Pub. No.: WO2004/073920

PCT Pub. Date: Sep. 2, 2004

(65) Prior Publication Data

US 2006/0207300 A1 Sep. 21, 2006

Related U.S. Application Data

(60) Provisional application No. 60/448,382, filed on Feb. 18, 2003.

(51) Int. Cl.
*E04G 3/00* (2006.01)

(52) U.S. Cl. .............................. 248/297.11; 248/229.12

(58) Field of Classification Search ............... 312/38 A; 248/297.11, 229.11, 229.12, 230.2, 230.3, 248/231.41, 231.31; 187/404; 901/49; 70/58, 70/19; 269/252, 253
See application file for complete search history.

(56) References Cited

U.S. PATENT DOCUMENTS

| 214,907 | A | * | 4/1879 | Grimmitt ..................... 269/248 |
| 2,261,055 | A | * | 10/1941 | Dulaney ........................... 81/6 |
| 2,603,325 | A | | 7/1952 | Pickard |
| 4,448,406 | A | * | 5/1984 | Hallberg et al. .............. 269/224 |
| 4,715,574 | A | | 12/1987 | Holt et al. |
| 5,092,572 | A | * | 3/1992 | Litwak et al. ................... 5/600 |
| 5,172,895 | A | * | 12/1992 | Klimach ....................... 269/41 |
| 5,501,440 | A | * | 3/1996 | Blise .......................... 269/253 |
| 6,813,913 | B2 | * | 11/2004 | Watts .......................... 70/38 A |

FOREIGN PATENT DOCUMENTS

JP 62-132009 6/1987

* cited by examiner

*Primary Examiner*—Ramon O Ramirez
(74) *Attorney, Agent, or Firm*—RatnerPrestia

(57) ABSTRACT

A safety lock comprises a locking member (26, 28) which engages a support. An inner lock shaft (30*a*) actuates the locking member, the inner lock shaft having a first coupling face (35*a*) at one end thereof. An outer lock shaft (30*b*) has a second coupling face (35*b*) which engages the first coupling face when the inner lock shaft and the outer lock shaft are in respective engagement positions relative to each other. A coupling structure (18) moves to prevent engagement of said first coupling face with said second coupling face.

15 Claims, 11 Drawing Sheets

SAFETY MECHANISM FOR MATERIALS HANDLING SYSTEM

This application is a U.S. National Phase Application of PCT/US2004/004936 filed on Feb. 18, 2004, which claims priority based on U.S. Provisional Patent Application 60/448,382 filed on Feb. 18, 2003.

FIELD OF THE INVENTION

The present invention relates, in general, to supporting a load and, in particular, to a safety mechanism used with a load. More specifically, a safety mechanism is disclosed which prevents sudden motion of a counterbalanced main arm when the main arm ceases to be in a counterbalanced state.

BACKGROUND OF THE INVENTION

In the manufacture of integrated circuits (ICs) and other electronic devices, testing with automatic test equipment (ATE) is performed at one or more stages of the overall process. A special handling apparatus is used to place the device under test ("DUT") into position for testing. In some cases, the special handling apparatus may also bring the DUT to the proper temperature and/or maintain it at the proper temperature to be tested. The special handling apparatus is of various types including "probers" for testing unpackaged devices on a wafer and "device handlers" for testing packaged parts; herein, "peripheral" or "peripherals" will be used to refer to all types of such apparatus. The electronic testing itself is provided by a large and expensive ATE system. The DUT requires precision, high-speed signals for effective testing; accordingly, the "test electronics" within the ATE, which are used to test the DUT, are typically located in a test head, which must be positioned as close as possible to the DUT. The test head is extremely heavy; the size and weight of test heads have grown over the years from a few hundred pounds to as much as three to four thousand pounds.

In order to use a test head to test integrated circuits, the test head is typically "docked" to a peripheral. When docked, the test head must be located as close as possible to the peripheral's test site in order to minimize signal degradation. A test head positioning system may be used to position the test head with respect to the peripheral and may be designed to facilitate flexible docking and undocking of a test head with a variety of peripherals. A test head positioning system may also be referred to as a test head positioner or test head manipulator. Test head positioning systems have been described in numerous patents.

In the ordinary operation of a test head positioning system, a counterbalanced arm brings and holds the test head into a desired position. Once the test head is in the desired position, the arm may be locked in place. With such systems, if the balance condition is lost while the arm is locked in place and this fact is unknown to the operator of the positioning system, upon release of the locking mechanism moveable parts of the positioning system will move in a rapid and uncontrolled manner.

The risk of imbalance normally comes in the installing, removing or changing of test heads. If the positioner system is locked and then one removes the test head from the arm but forgets to remove the source of the counterbalance (e.g. weights) before unlocking the main arm, then the main arm would fly up. Conversely, if the positioner system is locked and one removes the weights without removing the test head before the lock is released, then the test head falls.

If one adds or removes too many weights prior to unlocking the arm, then there is an imbalance which can cause the test head to fly upwards or downwards after the lock is released.

Finally, while breakage of the cable that couples the arm to the counterbalanced system is unlikely, such breakage is not impossible.

U.S. Pat. No. 4,715,574 provides a safety lock system for a materials handling system such as a test head positioning system. That safety lock system operates in a manner so that if a balance condition is lost while the system is locked, the system cannot be unlocked. More specifically, that system has a safety lock that moves with the main arm. A handle is used for locking the main arm in place. The safety lock prevents rotation of the handle upon a preselected movement of the arm caused by a loss of the balanced condition. If the handle cannot be rotated, then the lock cannot be released.

SUMMARY OF THE INVENTION

A safety lock comprises a locking member which engages a support. An inner lock shaft actuates the locking member, the inner lock shaft having a first coupling face at one end thereof. An outer lock shaft has a second coupling face which engages the first coupling face when the inner lock shaft and the outer lock shaft are in respective engagement positions relative to each other. A coupling structure moves to prevent engagement of said first coupling face with said second coupling face.

DETAILED DESCRIPTION OF THE INVENTION

Referring again to the safety lock disclosed in U.S. Pat. No. 4,715,574, upon a preselected movement of the arm caused by a loss of counterbalance to the arm, the safety lock prevented rotation of the handle that released the lock. It was known to the inventors, however, that certain users of the safety lock forgot its purpose. Thus, when those users couldn't turn the handle by hand, they would force the handle, thus breaking internal teeth which were preventing the lock from being released.

Accordingly, the present invention relates to a new and improved materials handling system. Furthermore, a safety mechanism is disclosed for a materials handling system for a load such as a test head (or other electronic testing device). Thus, if a balanced condition is lost while the system is locked, the system cannot be unlocked and the load cannot be moved.

Figure 1:
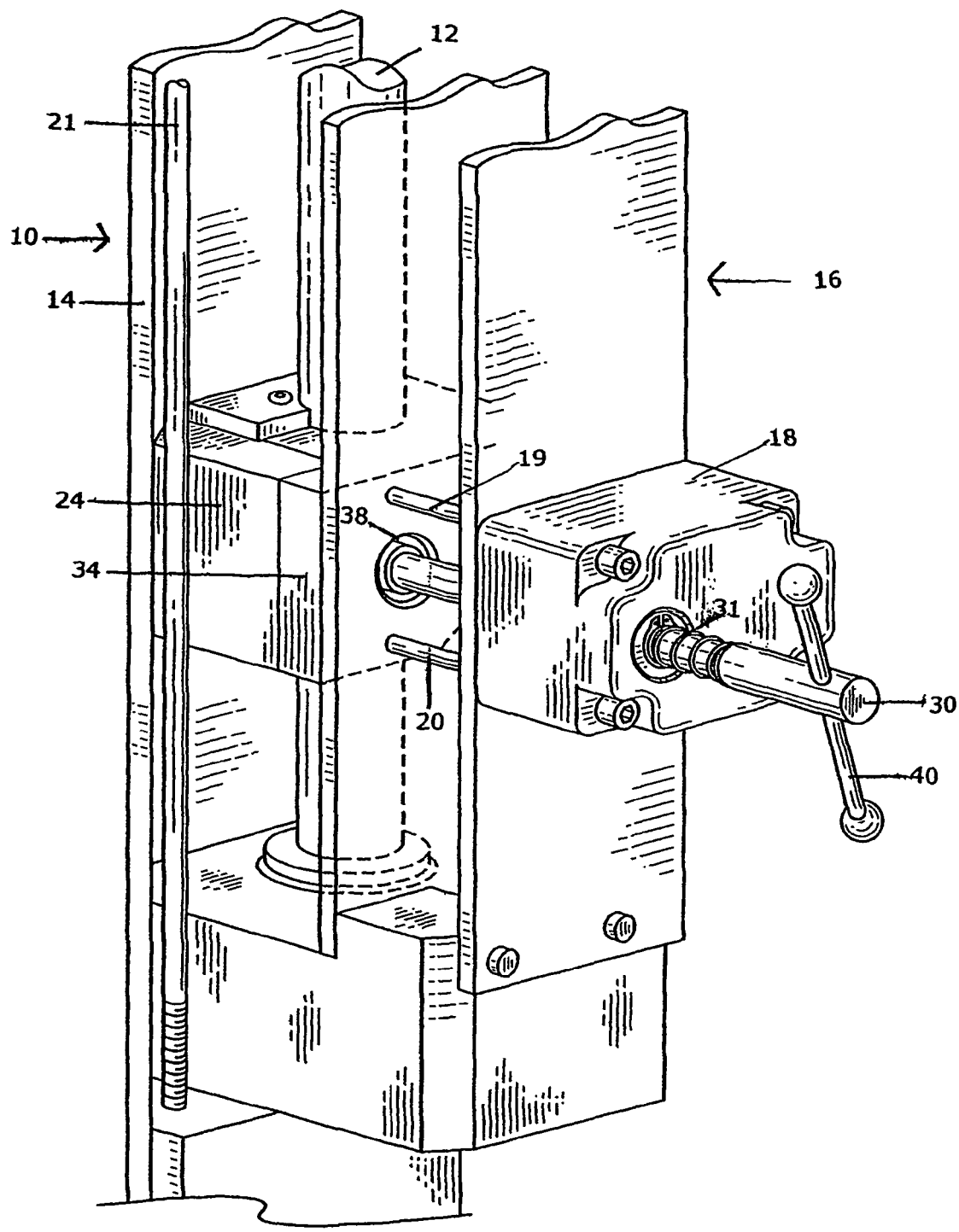
FIG. 1 is a perspective view of a first exemplary embodiment of the present invention.
Figure 2:
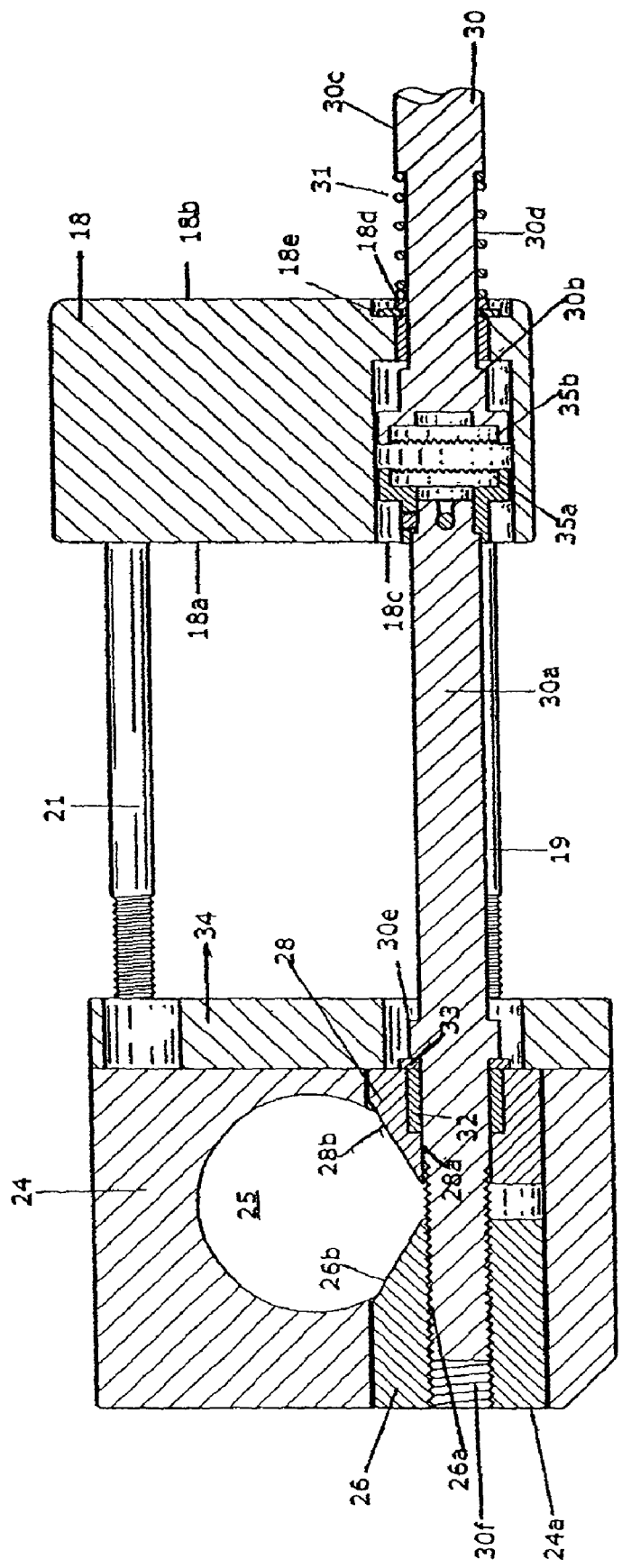
FIG. 2 is a top section view of a first exemplary embodiment of the present invention.

Referring to FIGS. 1 and 2, a first embodiment of a materials handling system, constructed in accordance with the present invention, includes a support, identified generally by reference numeral 10, which includes a vertical support shaft 12. Support 10 may also include a column 14, in the form of an H-shaped beam (not shown), which extends upward from a base plate (not shown). Additional details about support 10, the H-shaped beam, and the base plate can be obtained by reference to U.S. Pat. No. 4,527,942 and U.S. Pat. No. 4,715,574. Load carrying unit 16 is adapted to receive a load which is to be positioned at a desired height along shaft 12. Load carrying unit 16 includes an I-beam (not shown) which is mounted for movement along shaft 12 by means of a pair of bearing blocks (not shown). Additional details about load carrying unit 16 and the manner in which the load carrying unit receives a load for positioning along shaft 12 can be obtained by reference to U.S. Pat. No. 4,527,942 and U.S. Pat. No. 4,715,574.

The materials handling system illustrated in FIGS. 1 and 2 further includes counterbalancing means coupled to load carrying unit 16 for placing the load carrying unit and the load in substantially weightless condition. Only cable 21 of the counterbalancing means is shown in FIG. 1.

A lock collar 24 having a bore 25, through which shaft 12 extends, is movable along the shaft 12. A locking member system within lock collar 24 having two locking members (e.g. wedges) 26 and 28 project through the wall of the bore 25 in lock collar 24 and engage shaft 12 to lock the lock collar 24 against vertical movement along shaft 12. This is accomplished by a rotatable handle 30 coupled to wedges 26 and 28. Wedge 26 has a threaded bore 26a. Wedge 28 has a bore 28a that is not threaded. Wedges 26 and 28 have angled faces 26b and 28b, respectively, each of which may be tangential to bore 25 and to shaft 12.

Lock collar 24 has a bore 24a which receives wedges 26 and 28 and the inner lock shaft 30a of a handle 30. A threaded end 30f of inner lock shaft 30a engages the threaded bore 26a in wedge 26. Wedge 28 is mounted on inner lock shaft 30a by means of a needle bearing 32 and rotates freely about the inner lock shaft. The interplay between the threads on inner lock shaft 30a and the threaded bore during rotation of inner lock shaft 30a actuates movement of wedge 26. Clockwise rotation of inner lock shaft 30a moves wedge 26 toward wedge 28. When wedges 26 and 28 are held tightly together, they lock the lock collar 24 to shaft 12. Rotating inner lock shaft 30a counter clockwise moves wedge 26 away from wedge 28. When wedge 26 is a sufficient distance from wedge 28, lock collar 24 is no longer locked to shaft 12 allowing the lock collar to move vertically along the shaft. The end of inner lock shaft 30a away from threads 30f has a coupling face 35a with jaw-teeth thereon.

A second part of handle 30 is an outer lock shaft 30b. One end 30c of outer lock shaft 30b has a handle 40 which may be used to turn outer lock shaft 30b. The other end of outer lock shaft 30b has a coupling face 35b with jaw teeth thereon.

When jaw-tooth couplings 35a and 35b are mutually engaged, rotation of handle 30 in one direction causes wedges 26 and 28 to engage shaft 12 and to fix the position of lock collar 24 on shaft 12. Otherwise, rotation of handle 30 in an opposite direction causes wedges 26 and 28 to become disengaged from shaft 12, thereby permitting lock collar 24 to be moved along the shaft.

When inner lock shaft 30a and outer lock shaft 30b are aligned, the jaw teeth on coupling faces 35a and 35b may be engaged with each other. When the two jaw-tooth couplings are engaged, rotation of outer lock shaft 30b causes inner lock shaft 30a to similarly rotate, which actuates wedge 26.

A coupling structure 18 is connected to load carrying unit 16 and to friction block 34 by means of four bolts which extend from the coupling structure into the friction block 34. Some of the bolts are shown in FIGS. 1-4. Coupling structure 18 has a first face 18a and a second face 18b. An elongated bore 18c is located within face 18a. There are two concentric bores 18d and 18e in face 18b. The diameter of bore 18d is smaller than the diameter of bore 18e. The depth of bore 18e within coupling structure 18 is less than the depth of bore 18d. Bore 18d extends from the inside of bore 18e until it meets bore 18c.

Jaw-tooth couplings 35a and 35b may be located within bore 18c of coupling structure 18. Bore 18c is large enough to hold jaw-tooth couplings 35a and 35b. Bore 18d is large enough to allow entry and rotation of outer lock shaft 30b.

Outer lock shaft 30b is a single piece that is machined into two separate sections 30c and 30d, the diameter of section 30d being less than the diameter of section 30c. The junction of sections 30c and 30d forms a lip. A compression spring 31 is located between the annular wall of bore 18e within coupling structure 18 and the lip formed by the junction of sections 30c and 30d. Compression spring 31 applies a horizontal force against outer handle section 30b to force it away from face 18b, thereby tending to force jaw-tooth couplings 35a and 35b apart. Therefore, even when inner lock shaft 30a and outer lock shaft 30b are aligned, jaw-tooth couplings 35a and 35b may not be engaged because of the outward force exerted by compression spring 31 on outer lock shaft 30b. Jaw-tooth couplings 35a and 35b may be engaged when an operator forces outer lock shaft 30b in toward inner lock shaft 30a against the compression force of spring 31.

In normal operation, load carrying unit 16 and the load (not shown) carried by the load carrying unit are counterbalanced to permit easy movement along shaft 12 to position the load at a desired height. Next, lock collar 24 is locked in place along shaft 12 by turning handle 30 clockwise to cause wedges 26 and 28 to engage the shaft. When load carrying unit 16 and its load are to be repositioned, handle 30 is turned counterclockwise to disengage wedges 26 and 28 from shaft 12.

If the balanced system becomes unbalanced while lock collar 24 is locked to shaft 12 and this fact is unknown to the individual unlocking the lock collar from the shaft, an undesirable condition exists. A loss in the counterweights causes load carrying unit 16 and its load to move downward suddenly, while removal of the load will cause unit 16 to move upward suddenly.

Figure 5A:
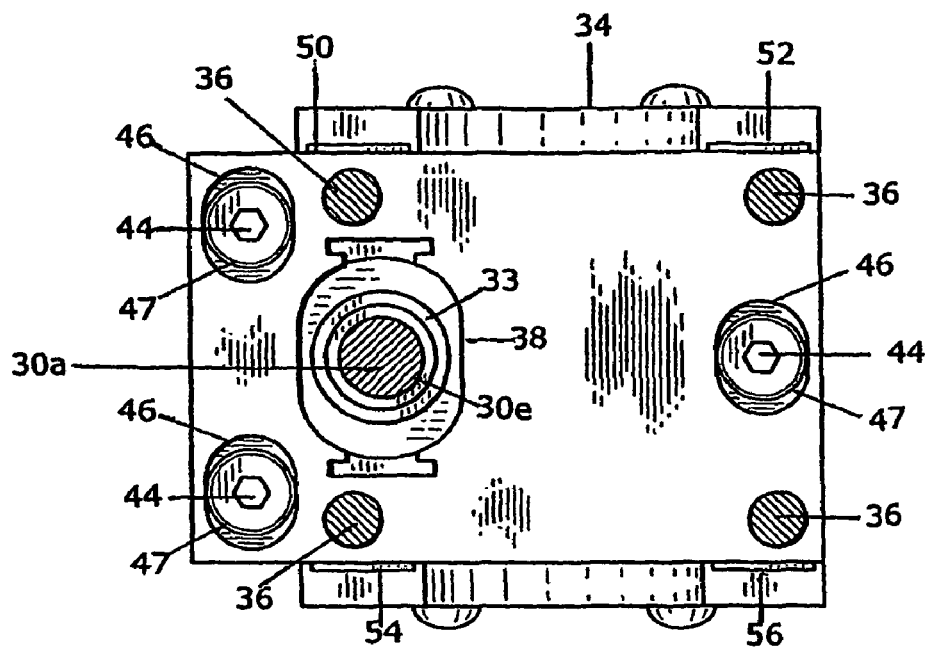
FIG. 5A is a vertical section taken along line 5A-5A of FIG. 3.

Accordingly, the present invention includes a prevention mechanism that prevents jaw-tooth couplings 35a and 35b from engaging upon a preselected movement of the load carrying unit relative to lock collar 24. The prevention mechanism includes friction block 34 and its relationship to coupling structure 18 and outer lock shaft 30b. Friction block 34 bears against and is secured to the I-beam and to lock collar 24. As shown in FIG. 5A, friction block 34 has a bore 38 through which inner lock shaft 30a may extend. A series of holes 36 permit bolts such as bolts 19, 20, and 21 to connect friction block 34 to coupling structure 18.

The coupling of friction block 34 to lock collar 24 and outer lock shaft 30b reacts to the relationship between the weight and counterweight to cause either an alignment or a non-alignment of inner lock shaft 30a and outer lock shaft 30b. The two shafts are aligned when the load is substantially weightless. If the load loses too much of its weightless characteristic, a preselected amount of relative movement between the load and the counterweight causes the inner lock shaft and the outer lock shaft to become misaligned, thereby preventing the outer shaft from rotating the inner lock shaft 30a and preventing movement of wedge 26.

Referring to FIG. 5A, the determination of such relative movement is accomplished, in part, by a plurality of socket head screws 44 having the undersides of their heads slip fit against the bottoms of a corresponding number of elongated counterbores 46 provided in that face of friction block 34. The screws 44 extend through bores 47 in friction block 34 into lock collar 24. The opposite face of friction block 34 bears against lock collar 24.

Bores 47 are elongated and sized relative to the diameters of screws 44 to permit a preselected vertical movement of load carrying unit 16 relative to lock collar 24 while the lock collar is locked to shaft 12. The clearance for the screws 44 to move vertically within bores 47 is shown in FIG. 5A. The friction block 34 may slide relative to lock collar 24 for vertical movement of load carrying unit 16 while the lock collar is locked to shaft 12.

Figure 3:
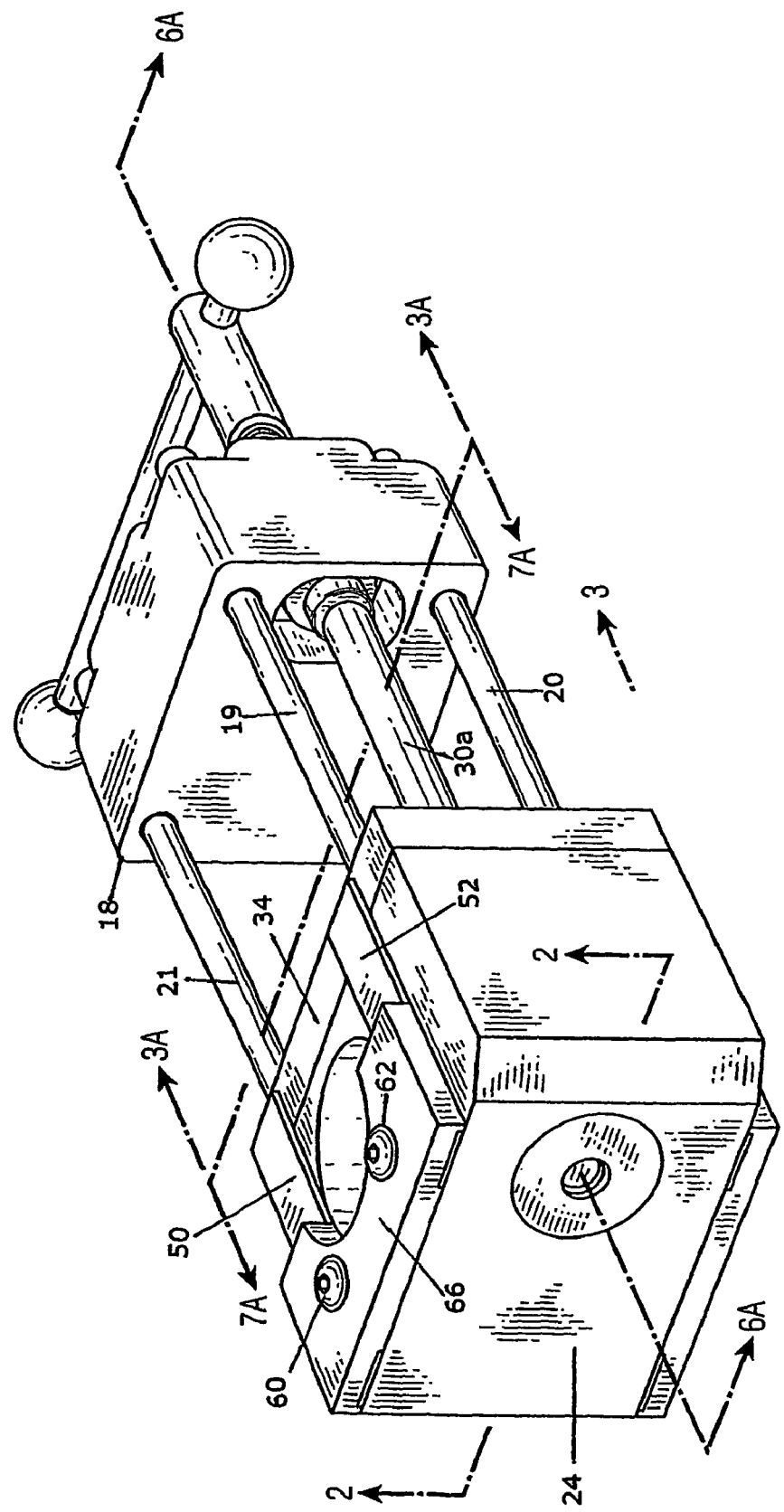
FIG. 3 is a perspective view of an in-balance condition of a lock collar, a friction block, and a coupling box when the unit being positioned is held in a substantially weightless condition by the counterbalances.
Figure 4:
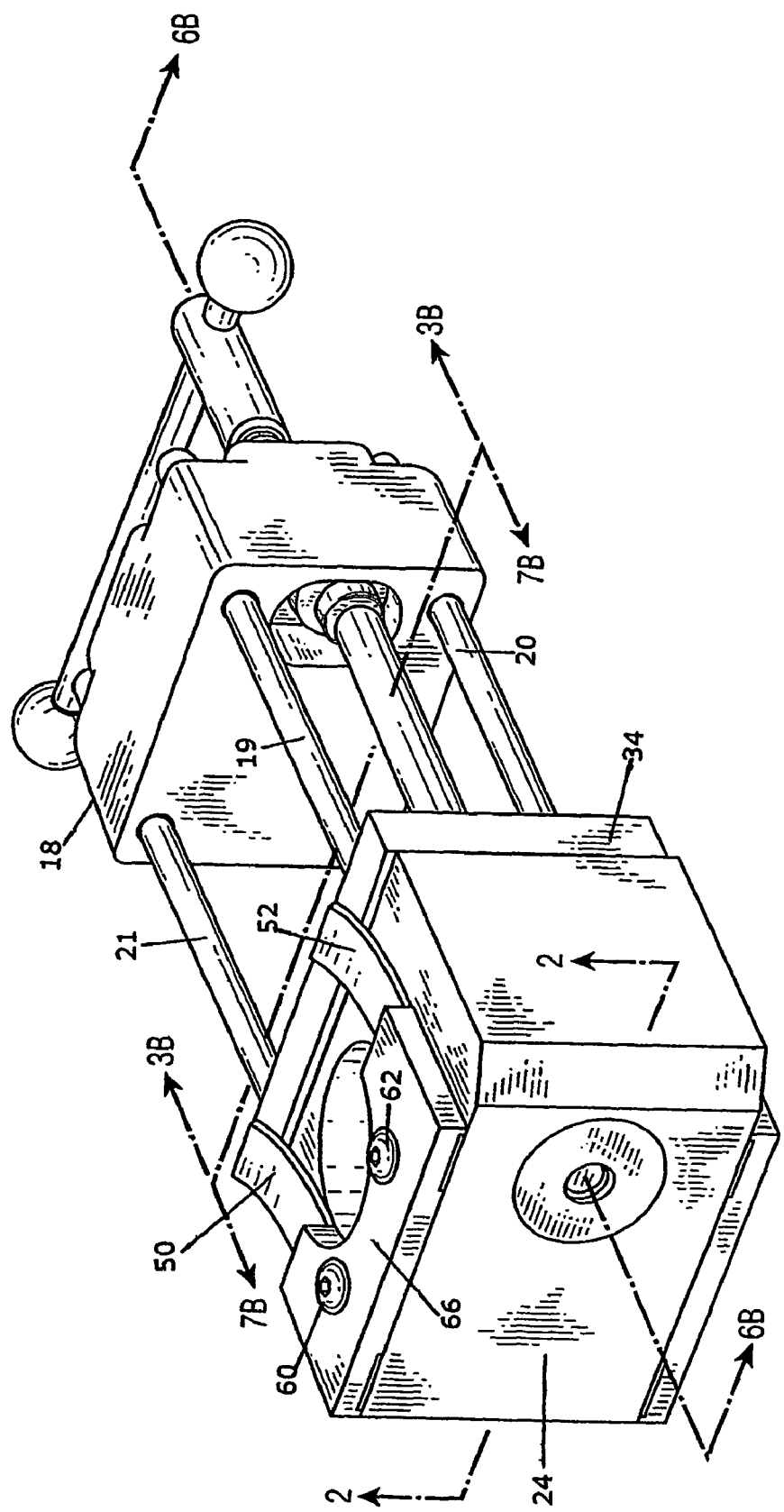
FIG. 4 is a perspective view of an out-of-balance condition of the lock block, the panel block, and the coupling box when the unit being positioned is in an unbalanced condition.

FIGS. 3, 4, 5A, 5B, 6A, and 6B show how the apparatus may be used to detect relative movement between load carrying unit 16 and lock collar 24 when there is an imbalance from the substantially weightless condition. Four leaf springs are all attached to the lock collar. Leaf springs 50 and 52 are attached to the top of the lock collar 24 via plate 66 and fasteners 60 and 62. Leaf springs 54 and 56 are similarly attached to the bottom of the lock collar. As shown in FIG. 3, when the tops of lock collar 24 and friction block 34 are at substantially the same level, leaf springs 50 and 52 extend from the top of the lock collar and bear against the top of friction block 34 during the substantially weightless condition of load carrying unit 16. Similarly, leaf springs 54 and 56 extend from the bottom of the lock collar and bear against the bottom of friction block 34 during the substantially weightless condition of the load carrying unit. Until the resistance of leaf springs 50 and 52 against upward movement of friction block 34 is exceeded or until the resistance of leaf springs 54 and 56 against downward movement of the friction block 34 is exceeded, the friction block 34 remains in place and the teeth of the jaw-tooth couplings may be engaged.

Figure 7A:
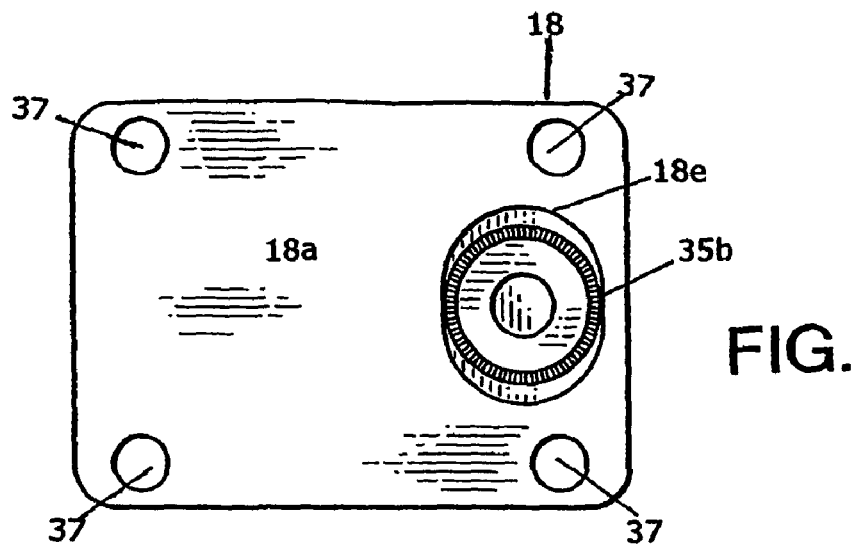
FIG. 7A is a side view of the coupling box.
Figure 7B:
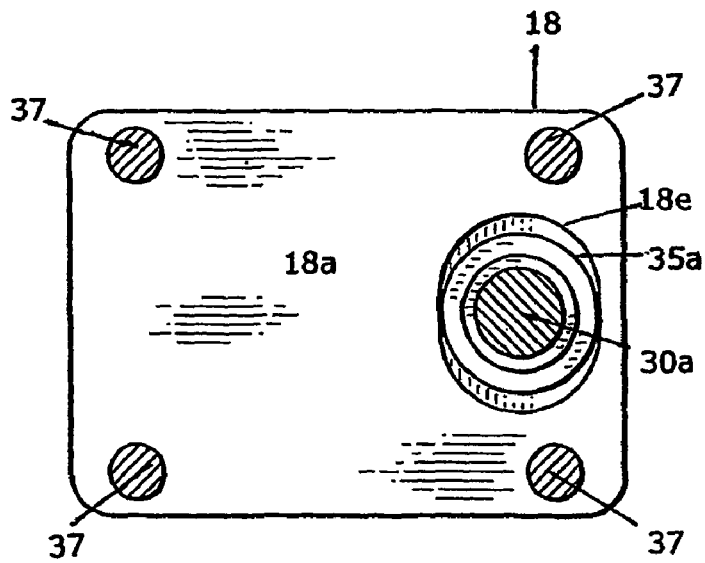
FIG. 7B is a vertical section taken along line 7B-7B of FIG. 3.

Referring to FIG. 7A, face 18a of coupling structure 18 is shown. Holes 37 are adapted to receive bolts such as bolts 19, 20, and 21 which connect the coupling box to load carrying unit 16, lock collar 24, and friction block 34. FIG. 3 also shows the teeth of jaw-tooth coupling 35b inside bore 18e. FIG. 7B shows the side of jaw-tooth coupling 35a that is coupled to inner lock shaft 30a. Because the load carrying unit is substantially weightless, jaw-tooth coupling 35a is aligned with jaw-tooth coupling 35b, thereby preventing jaw-tooth coupling 35b from being seen in FIG. 7A.

Figure 6A:
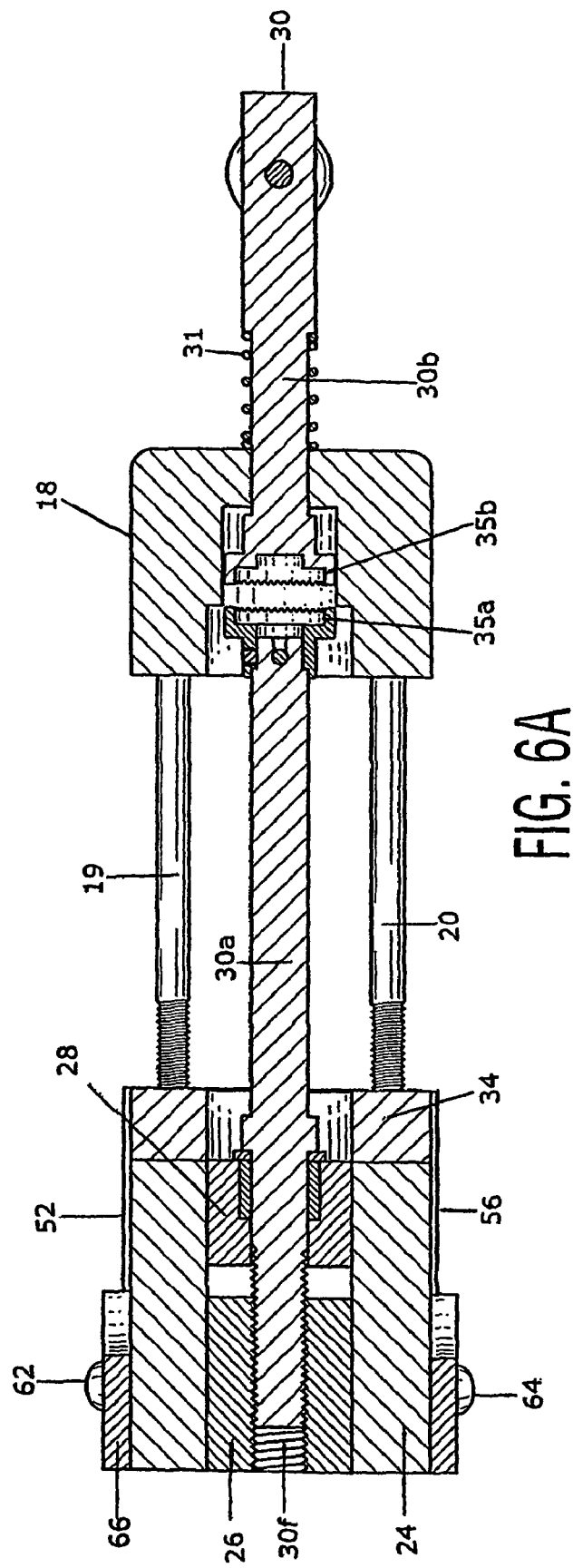
FIG. 6A is a vertical section taken along line 6A-6A of FIG. 3.

When the load carrying unit is substantially weightless, the relative positions of other parts of the apparatus are shown in FIGS. 3, 5A and 6A. As shown in FIG. 3, bolts 19, 20 and 21 are all substantially parallel to inner lock shaft 30a. Since the inner and outer lock shafts are aligned, bolts 19, 20 and 21 and also all substantially parallel to outer lock shaft 30b. As shown in FIG. 5A, screws 44 are centered within bores 47. As shown in FIG. 6A, leaf springs 52 and 56 extend in a flat manner from lock collar 24 to and against the top of friction block 34. This orientation of the leaf springs with the lock collar and the friction block 34 means that the friction block has not moved relative to the lock collar. Consequently, jaw-tooth couplings 35a and 35b are aligned and may be engaged. Because of the alignment of jaw-tooth couplings 35a and 35b, handle 30 may be turned to release wedges 26 and 28 from shaft 12.

Figure 5B:
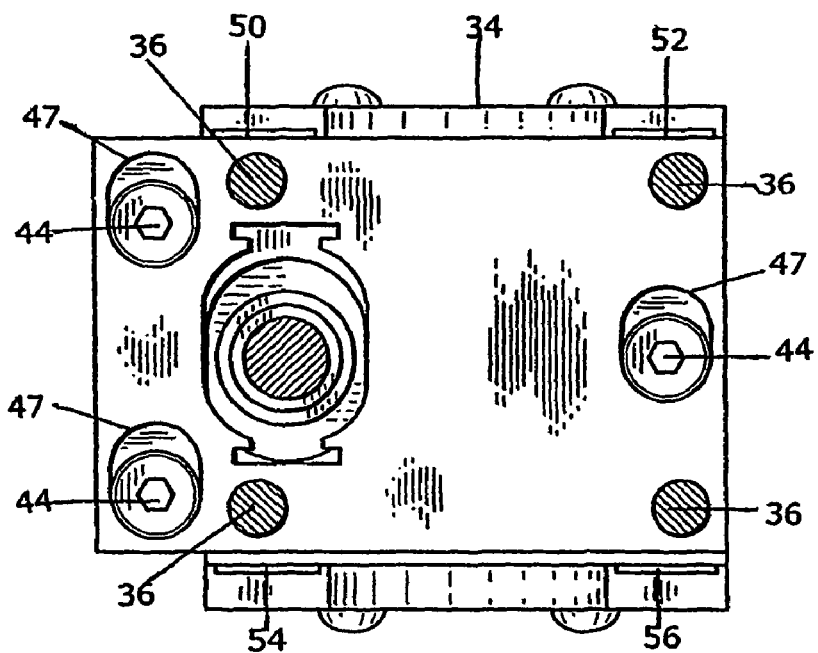
FIG. 5B is a vertical section taken along line 5B-5B of FIG. 4.
Figure 6B:
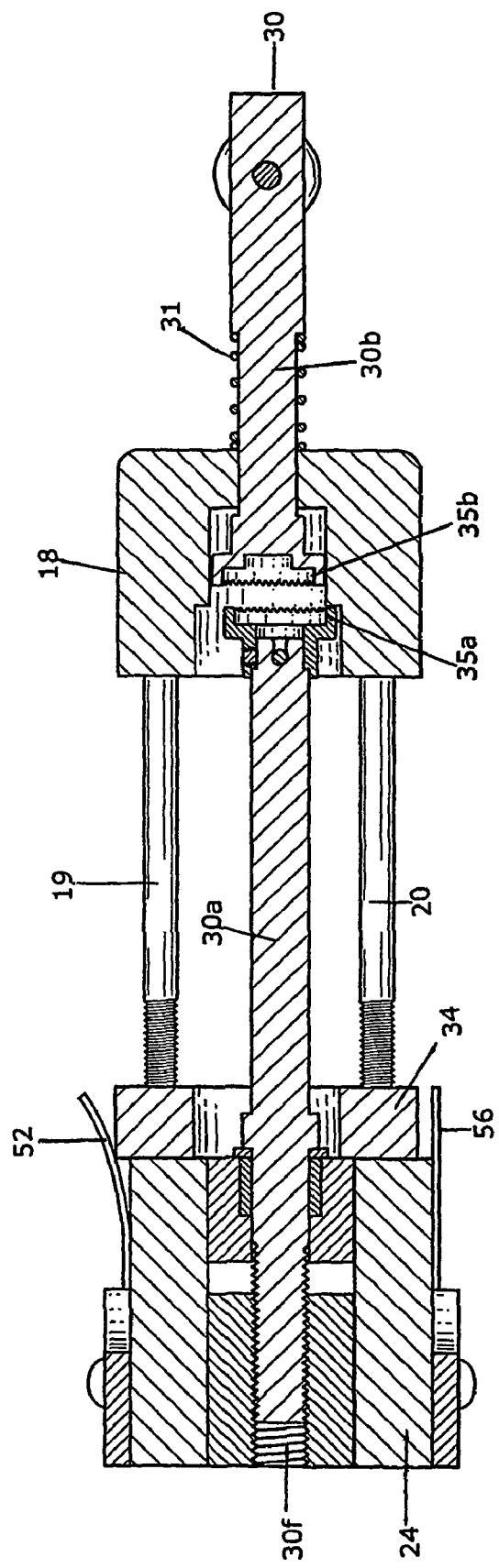
FIG. 6B is a vertical section taken along line 6B-6B of FIG. 4.
Figure 7C:
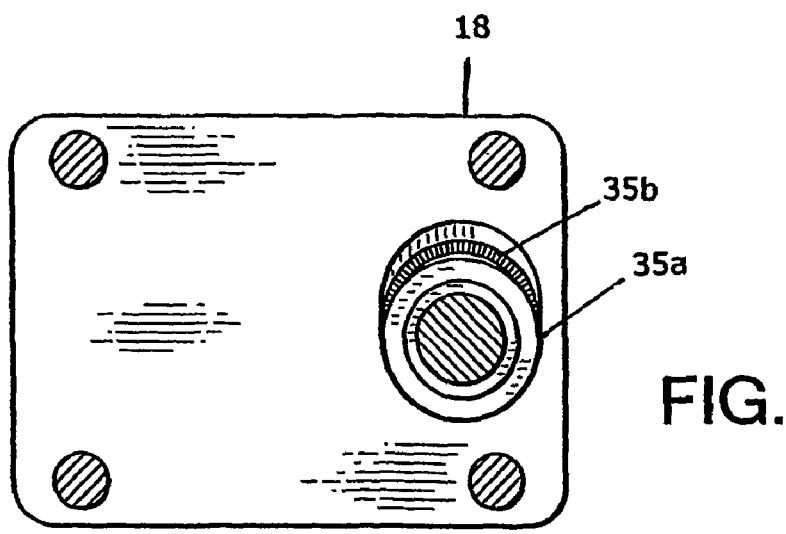
FIG. 7C is a vertical section taken along line 7C-7C of FIG. 4.

FIGS. 4, 5B, 6B and 7C show the orientation of the elements of the invention when the load carrying unit is not substantially weightless. Under that circumstance, when the resistance of leaf springs 50 and 52 against upward movement of the friction block 34 is exceeded, friction block 34 moves upward forcing leaf springs 50 and 52 upward. The effect of the upward movement of coupling structure 18 is shown in FIGS. 7B and 7C. A comparison between FIGS. 5A and 5B shows that the relative positions of screws 44 and bores 46 has changed. In FIG. 5A, screws 44 are in the center of bores 47, the tops of the bolts in upper holes 36 are substantially level with the tops of upper screws 44, and the bottoms of the bolts in lower holes 36 are below the bottoms of lower screws 44. In FIG. 5B, bores 47 have moved upward along with friction block 34 resulting in screws 44 being located at the bottom of bores 47. As a result, the tops of the bolts in upper holes 36 are no longer substantially level with the tops of upper screws 44. Instead, the tops of upper screws 44 are below the tops of the bolts in upper holes 36. Similarly, the bottoms of the bolts in lower holes 36 are now substantially level with the bottoms of lower screws 44.

The effect of the relative movement between lock collar 24 and friction block 34 is shown in FIGS. 6B and 7C. Referring to FIG. 6B, when friction block 34 moves upward, it causes the four bolts, including bolts 19 and 20, to also move upward. It will be understood that the other two bolts, such as bolt 21 shown in FIG. 4, will also move upward. Inner lock shaft 30a does not move relative to lock collar 24 because inner lock shaft 30a is coupled to wedge 28 and no part of wedge 28 is inside friction block 34. Therefore, inner lock shaft 30a remains stationary when friction block 34 moves. As shown in FIGS. 5B, 6B and 7A, bolts 19 and 20 are coupled to coupling structure 18 via holes 37. As shown in FIG. 6B, upward movement of bolts 19 and 20 causes coupling structure 18 to also move upward. Because outer lock shaft 30b is located tightly within a small bore in coupling structure 18, outer lock shaft 30b is misaligned relative to inner lock shaft 30a thereby preventing engagement of jaw-tooth couplings 35a and 35b and further preventing rotation of handle 10 from opening wedges 26 and 28. The relationship between jaw-tooth couplings 35a and 35b during misalignment of the inner and outer lock shafts is also shown in FIG. 7C wherein jaw-tooth coupling 35b is above, and not aligned or engaged with, jaw-tooth coupling 35a.

Figure 8:
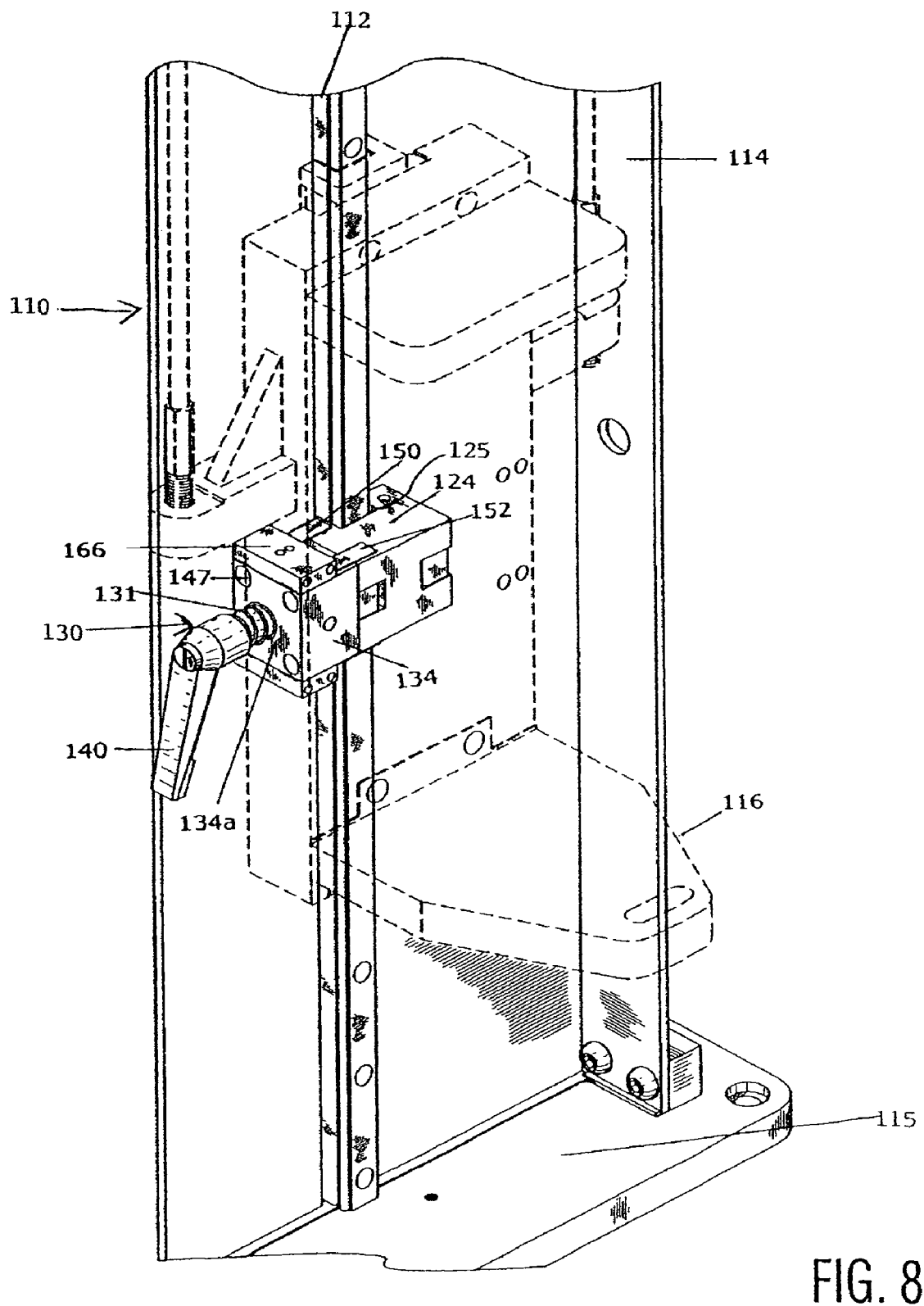
FIG. 8 is a first perspective view of a second embodiment of the invention showing the load carrying unit.
Figure 9:
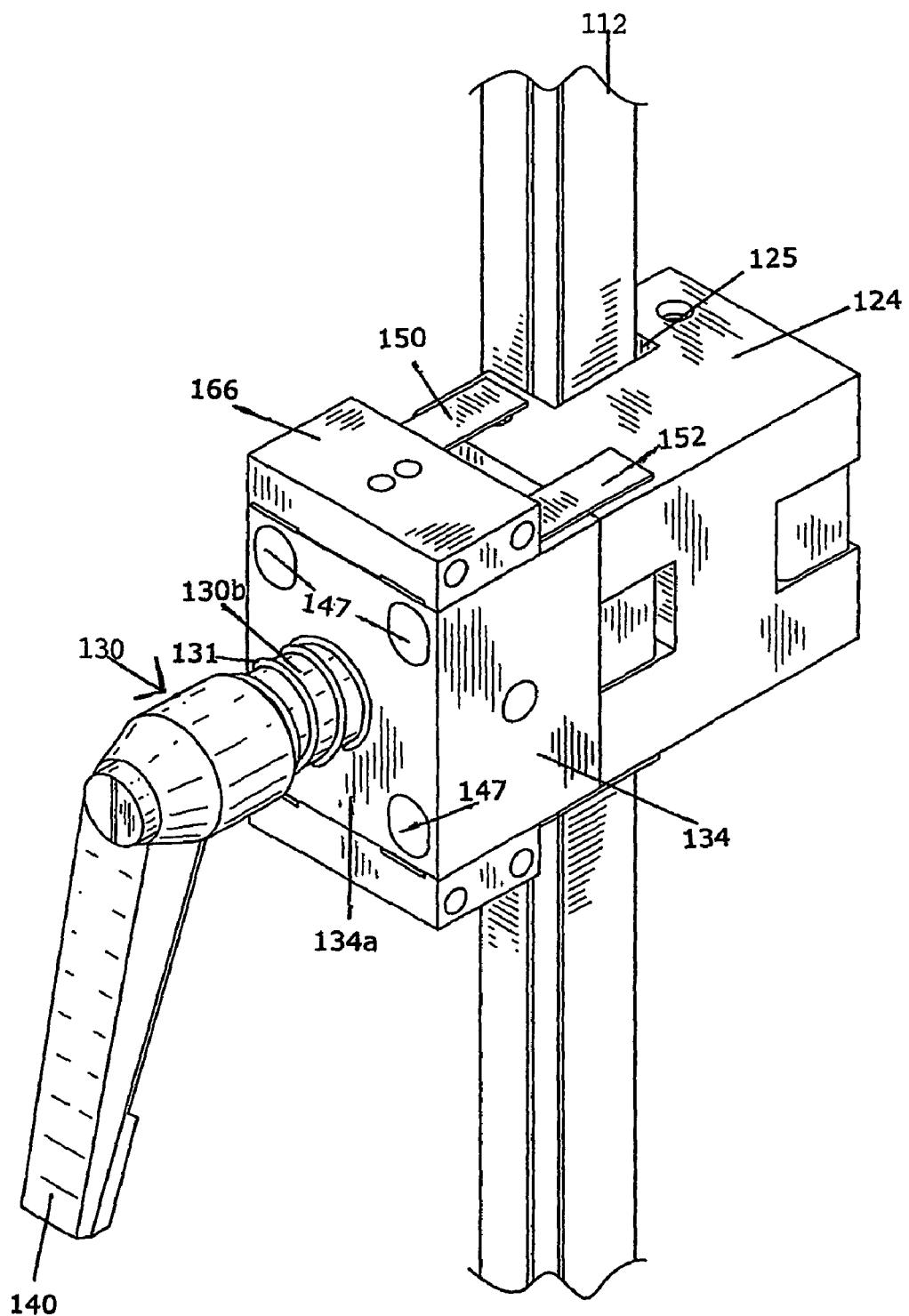
FIG. 9 is a second perspective view of a second embodiment of the invention without the load carrying unit.
Figure 10:
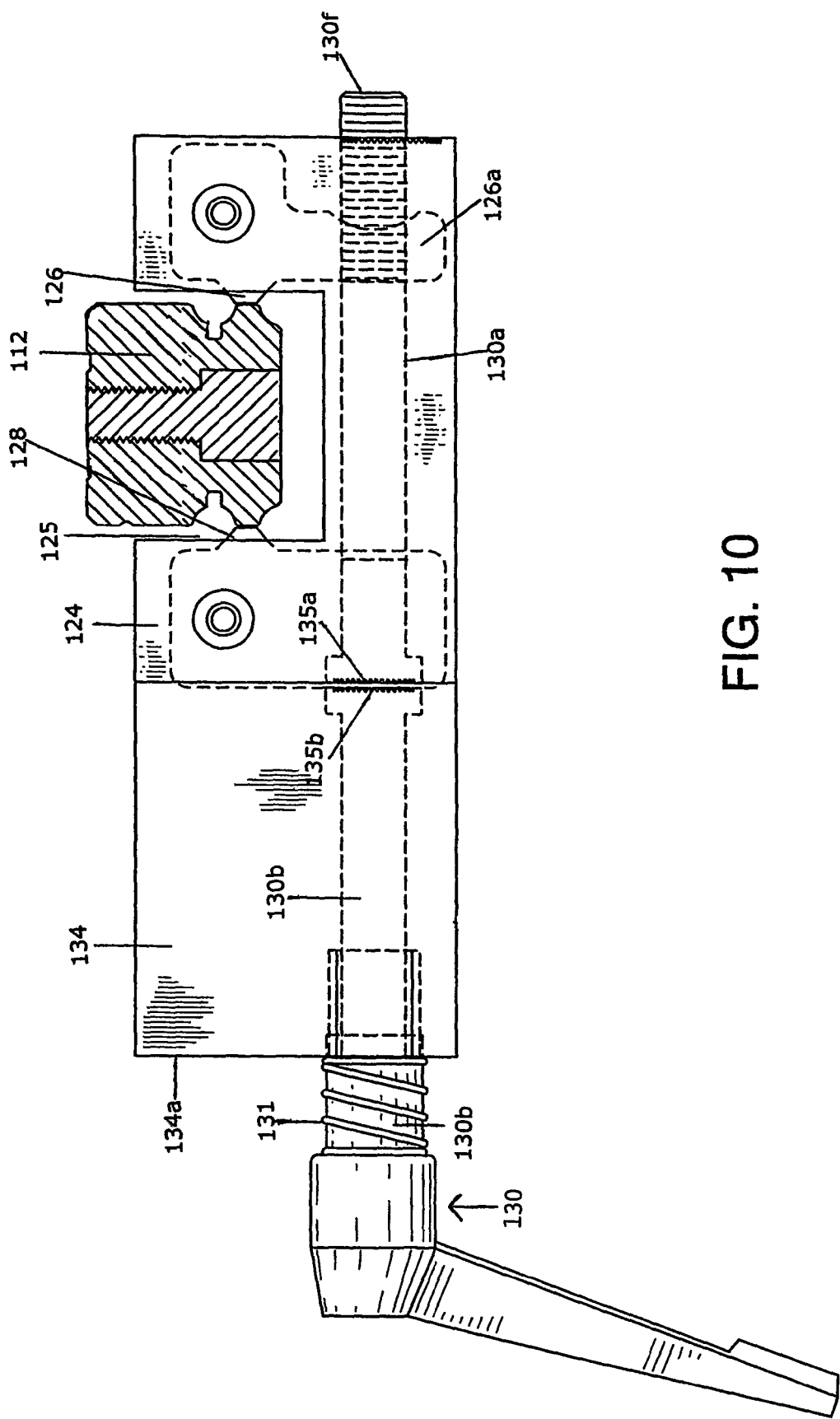
FIG. 10 is a top section view of FIG. 8.

FIGS. 8-10 show a second exemplary embodiment of the invention. Referring to FIGS. 8 and 9, a second embodiment of a materials handling system, constructed in accordance with the present invention, includes a support identified generally by reference numeral 110, which includes a vertical support rail 112. Support 110 may also include a column 114 which extends from a base plate 115. Load carrying unit 116 is adapted to receive a load which is to be positioned at a desired height along rail 112. Load carrying unit 116 is mounted for movement along rail 112.

The materials handling system illustrated in FIGS. 8-10 further includes counterbalancing means coupled to load carrying unit 116 for placing the load carrying unit and the load in substantially weightless condition.

A lock collar 124 having an opening 125, through which rail 112 extends, is movable along the rail 112. A caliper lock system within lock collar 124 having two calipers 126 and 128 project through the wall of the opening 125 in lock collar 124 and engage rail 112 to lock the lock collar against vertical movement along the shaft. This is accomplished by a rotatable handle 130 coupled to calipers 126 and 128. Caliper 126 has a threaded hole 126a. Caliper 128 is not threaded.

A threaded end 130f of inner lock shaft 130a engages the threads on caliper 126. Caliper 128 is also mounted on inner shaft 130a by means of a needle bearing (not shown) and rotates freely about the inner lock shaft. The interplay between the threads on inner lock shaft 130a and the threads on caliper 126 during rotation of inner lock shaft 130a actuates movement of caliper 126. Clockwise rotation of inner lock shaft 130a moves caliper 126 toward caliper 128. When calipers 126 and 128 are placed tightly against rail 112, they lock the lock collar 124 to rail 112. Rotating inner lock shaft 130a counter clockwise moves caliper 126 away from caliper 128. When caliper 126 is a sufficient distance from caliper 128, lock collar 124 is no longer locked to rail 112 allowing the lock collar to move vertically along the rail. The end of inner lock shaft 130a away from threads 130f has a coupling face 135a with jaw-teeth thereon.

A friction block 134 bears against and is secured to lock collar 124.

A second part of handle 130 is an outer lock shaft 130b. One end of outer lock shaft 130b has a handle 140 which may be used to turn outer lock shaft 130b. The diameter of handle 140 is greater than the diameter of outer lock shaft 130b. The junction of handle 140 and outer lock shaft 130b forms a lip. A compression spring 131 is located between face 134a of friction block 134 and the lip formed by the junction of handle 140 and outer lock shaft 130b. The other end of outer lock shaft 130b has a coupling face 135b with jaw teeth thereon. Outer lock shaft 130b and coupling face 135b are located within a bore in friction block 134. When jaw-tooth couplings 135a and 135b are mutually engaged, rotation of handle 130 in one direction causes calipers 126 and 128 to engage rail 112 and to fix the position of lock collar 124 on rail 112. Otherwise, rotation of handle 130 in an opposite direction causes calipers 126 and 128 to become disengaged from rail 112, thereby permitting lock collar 124 to be moved along the rail.

When inner lock shaft 130a and outer lock shaft 130b are aligned, the jaw teeth on coupling faces 135a and 135b may be engaged with each other. When the two jaw-tooth couplings are engaged, rotation of outer lock shaft 130b causes inner lock shaft 130a to similarly rotate, which actuates caliper 126.

As described above, jaw-tooth coupling 135a may be located within lock collar 124 and jaw-tooth coupling 135b may be located within friction block 134. Compression spring 131 applies a horizontal force against handle 140 and, consequently, against outer lock shaft 130b. This force pushes outer lock shaft 130b away from inner lock shaft 130a, thereby tending to push jaw-tooth couplings 135a and 135b apart. Therefore, even when inner lock shaft 130a and outer lock shaft 130b are aligned, jaw-tooth couplings 135a and 135b may not be engaged because of the outward force exerted by compression spring 131 on outer lock shaft 130b. Jaw-tooth couplings 135a and 135b may be engaged when an operator forces outer lock shaft 130b in toward inner lock shaft 130a against the compression force of spring 131.

The second exemplary embodiment of the invention prevents jaw-tooth couplings 135a and 135b from engaging upon a preselected movement of the load carrying unit relative to lock collar 124. The prevention mechanism includes friction block 134 and its relationship to lock collar 124. The second embodiment shown in FIGS. 8 and 9 have the same mechanisms as shown in FIG. 5A for sensing misalignment between the load and the counterweight. These mechanisms are shown generally as bores 147 in FIGS. 8 and 9.

Leaf springs 150 and 152 are attached to the top of the friction block 134 via clamp 166. Two additional leaf springs (not shown) are similarly attached to the bottom of friction block 134. When the tops of lock collar 124 and friction block 134 are at substantially the same level, leaf springs 150 and 152 extend from the top of friction block 134 and bear against the top of lock collar 124 during the substantially weightless condition of load carrying unit 116. Similarly, the leaf springs (not shown) clamped to the bottom of friction block 134 extend from the bottom of the lock collar and bear against the bottom of the friction block 134 during the substantially weightless condition of the load carrying unit. Until the resistance of leaf springs 150 and 152 against upward movement of friction block 134 is exceeded or until the resistance of the leaf springs clamped to the bottom of the friction block 134 is exceeded, the friction block 134 remains in place and the teeth of the jaw-tooth couplings may be engaged.

When the load carrying unit is substantially weightless, inner lock shaft 130a is aligned with outer lock shaft 130b and jaw-tooth couplings 135a and 135b may be engaged. Because of the engagement of jaw-tooth couplings 135a and 135b, handle 130 may be turned to release calipers 126 and 128 from rail 112.

When the load carrying unit is not substantially weightless, and when the resistance of leaf springs 150 and 152 against upward movement of the friction block 134 is exceeded, friction block 134 moves upward forcing leaf springs 150 and 152 upward. When there is relative movement between lock collar 124 and friction block 134, inner lock shaft 130a remains stationary because it is located within lock collar 124. Because outer lock shaft 130b is located tightly within a small bore in friction block 134, outer lock shaft 130b is misaligned relative to inner lock shaft 130a. The misalignment of the two lock shafts prevents engagement of jaw-tooth couplings 135a and 135b thereby preventing the outer shaft from rotating the inner shaft and preventing movement of caliper 126.

Although the invention is illustrated and described herein with reference to specific embodiments, the invention is not intended to be limited to the details shown. Rather, various modifications may be made in the details within the scope and range of equivalents of the claims and without departing from the invention.

What is claimed is:

1. A safety lock comprising:
   a locking member which engages a support;
   an inner lock shaft for actuating said locking member, said inner lock shaft having a first coupling face at one end thereof;
   an outer lock shaft having a second coupling face which is engagable with said first coupling face when said outer lock shaft is in an engagement position relative to said inner lock shaft;
   a coupling structure which moves to prevent engagement of said first coupling face with said second coupling face by moving said outer lock shaft away from said engagement position relative to said inner lock shaft.

2. A safety lock according to claim 1, wherein said locking member is a wedge or a caliper.

3. A safety lock according to claim 1, further comprising a lock collar in which said locking member is situated, wherein actuation of said locking member prevents movement of said lock collar along said support.

4. A safety lock according to claim 3, further comprising a coupling box secured to said lock collar and moveable thereto, said inner lock shaft held by said lock collar, said outer lock shaft held by said coupling box.

5. A safety lock according to claim 4, wherein flexible members secure said coupling box to said lock collar.

6. A safety lock according to claim 4, wherein said outer lock shaft is linearly stationary relative to said coupling box.

7. A safety lock according to claim 3, wherein a counterbalanced load is coupled to said lock collar.

8. A safety lock according to claim 7, wherein said coupling box is secured to said lock collar via a friction block which is rigidly attached to said coupling box, said load situated between said friction block and said coupling box.

9. A safety lock according to claim 7, wherein said load is a test head.

10. A safety lock according to claim 1, further comprising a spring loaded handle coupled to said outer lock shaft, said spring urging said first coupling face and said second coupling face apart.

11. A method of locking a load, said method comprising the steps of:
   operating an outer lock shaft and thus causing an inner lock shaft to cause a locking member to engage a support when respective first and second coupling faces of said inner lock shaft and said outer lock shaft are positioned for being engagable with each other; and
   operating said outer lock shaft without causing said inner lock shaft to disengage said locking member from said support so that said load remains locked when said respective first and second coupling faces of said inner lock shaft and said outer lock shaft are positioned away from being engagable with each other.

12. A method of locking a load according to claim 11, wherein said locking member is a wedge or a caliper which engages said support.

13. A method of locking a load according to claim 11, wherein said locking member is situated in a lock collar, a coupling box is secured to said lock collar and is movable thereto, said inner lock shaft is held by said lock collar, and said outer lock shaft is held by said coupling box, said inner lock shaft and said outer lock shaft are away from engagement with each other when said coupling box moves relative to said lock collar.

14. A method of locking a load according to claim 13, wherein said coupling box moves relative to said lock collar when counterbalancing of a load coupled to said coupling box changes.

15. A method of locking a load according to claim 11, wherein a spring urges said first coupling face and said second coupling face apart.

* * * * *